URBAN MOBILE RADIO TELEPHONE SYSTEM
Filed Oct. 8, 1956
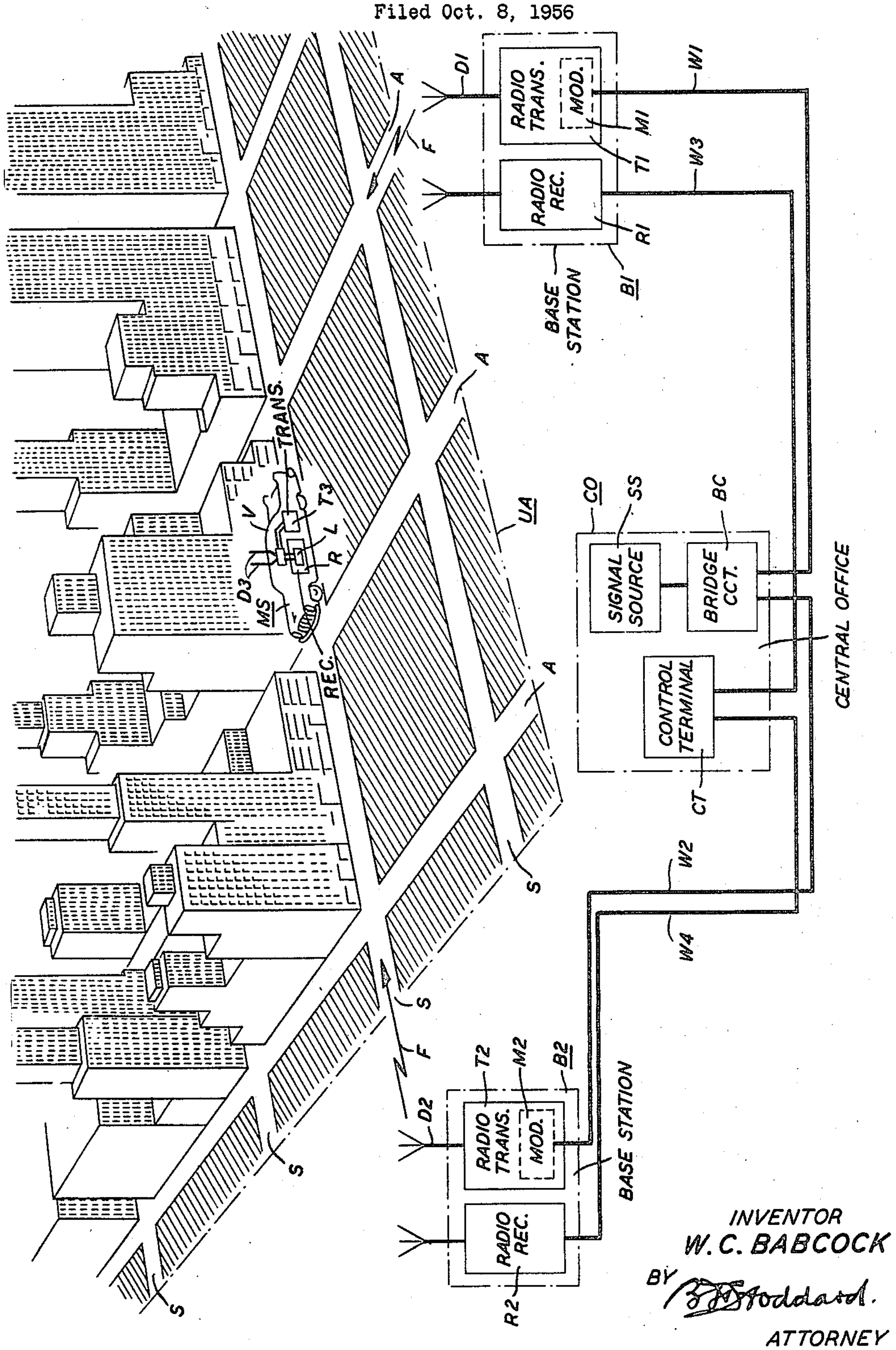
INVENTOR
W. C. BABCOCK
BY B. F. Stoddard
ATTORNEY 2,941,201
Patented June 14, 1960

2,941,201

URBAN MOBILE RADIO TELEPHONE SYSTEM

Wallace C. Babcock, Chatham, N.J., assignor to Bell Telephone Laboratories, Incorporated, New York, N.Y., a corporation of New York Filed Oct. 8, 1956, Ser. No. 614,620
2 Claims. (Cl. 343—100)

This invention relates to radiant energy signaling systems and, more particularly, to an ultra high frequency urban mobile radio telephone system.

In the mobile radio telephone art, it has been the practice for the mobile stations to be served by fixedly located base stations operating over carrier frequencies in the very high frequency region, such as about 150 megacycles. When the mobile stations are carried on vehicles which are moving along the avenues and streets of a city area, it has been found that deep shadow losses will occur in the transmission path from a base station to a vehicular station whenever the vehicle is so situated that tall buildings are in the direct signal transmission path extending from the base station to the vehicular station. This difficulty has been overcome to a certain extent by placing the antenna of the base station at the top of one of the tallest available buildings approximately in the center of the city, as is disclosed in an article entitled "Telephone Service for St. Louis Vehicles" and published on pages 267 to 269, inclusive, of July 1946, issue of the "Bell Laboratories Record."

As there are a large number of mobile radio telephone systems operating over channels in the 150 megacycle band, it has become necessary in some areas, when new systems are placed in service, to utilize channels in the ultra high frequency region, such as about 450 megacycles. With this higher operating frequency, greater shadow losses are encountered, even though the transmitting antennas are located on roofs of very tall buildings, due to the fact that shadow losses increase in magnitude directly with frequency. This is because the refraction of signals around obstacles diminishes as the signal frequency is increased. In other words, low frequency signals are bent almost completely around such obstacles as tall buildings, very high frequency signals are refracted partially around obstacles, but the extent to which ultra high frequency signals are refracted around obstacles is so small that the effect is practically the same as though the signals were completely blocked.

Accordingly, it is an object of this invention to provide an improved ultra high frequency urban mobile radio telephone system.

It is also an object of this invention to provide an ultra high frequency radio telephone system with improved means for transmitting signals in a service area having numerous physical obstacles, such as tall buildings.

These and other objects of the invention are accomplished by providing an ultra high frequency mobile radio telephone system with two co-channel base stations for serving an urban area having its avenues and streets arranged in the pattern of a grid. These base stations are located on the order of five or ten miles outside the city area, one being located in the direction of the avenues and the other being located in the direction of the streets. The transmitters at both base stations are energized at the same time for transmitting carrier waves of the same frequency and substantially the same intensity. Duplicate signal modulation is applied simultaneously to both transmitters over wire lines extending from a central office. Each base station transmitter is provided with a horizontally directive antenna orientated in such a manner that one radiates strong signals along the avenues while the other sends strong signals along the streets. To insure that a vehicular receiver is captured by only one of the carriers at any one time, each vehicular receiver is equipped with an antenna so designed as to have a directivity pattern in the horizontal plane resembling a figure eight with the nulls appearing at the sides of the vehicle and the main directivity axis parallel with the longitudinal axis of the vehicle so as to favor reception of carrier waves sent along the path of travel of the vehicle.

These and other features of the invention are more fully described in connection with the following detailed description of the drawing which is a schematic diagram of an ultra high frequency urban mobile radio telephone system in accordance with the invention.

In the drawing, an ultra high frequency urban mobile radio telephone system is shown to include two co-channel base stations B1 and B2 serving an urban area UA having its avenues A and streets S arranged at substantially right angles to each other in the pattern of a grid. The base stations B1 and B2 are provided with conventional radio transmitters T1 and T2, respectively, which are coupled to respectively associated transmitting antennas D1 and D2. The base stations B1 and B2 are situated about five or ten miles outside the urban area UA at suitable positions with one station, such as station B1, being located in the direction of the avenues A and the other station, such as station B2, being placed in the direction of the streets S. Since, for purposes of illustration, the avenues A are shown extending from north to south and the streets S extending from east to west, station B1 may be situated either to the north or to the south of the city area UA and station B2 may be situated either to the east or to the west of the city area UA.

It is desirable that the transmitting antennas D1 and D2 be located on high ground because it has been found that, when the effective height of a base station's transmitting antenna is 1,000 feet, the intensity of its carrier waves received in the urban area UA is about 20 decibels stronger than when the antenna's effective height is 100 feet. Since the effective height of an antenna is determined in part by the nature of the surrounding terrain, it is preferable to place the antennas D1 and D2 on high ground sloping toward the urban area UA. If the base stations B1 and B2 were located inside the urban area UA, it would be difficult to select preferred locations of this type for the antennas D1 and D2. However, an advantage of the present system is that, since the base stations B1 and B2 are to be situated five or ten miles outside the urban area UA with station B being either to the north or to the south and station B2 either to the east or to the west, considerable freedom is permitted in selecting favorable geographical sites for the antennas D1 and D2.

Due to the base stations being situated five or ten miles outside the urban area UA, it is possible to employ antennas having horizontal directivity. Accordingly, the transmitting antennas D1 and D2 are of any suitable conventional gain type having directivity in the horizontal plane. Since the antenna D1 is to be located to the north or south of the urban area UA while the antenna D2 is to be located to the east or west, it is possible to orientate the directivity axis of each of the antennas D1 and D2 in such a manner as to effectively cover the grid pattern of the urban area UA. Thus, the antenna D1 is so orientated as to propagate strong carrier waves along the avenues A, and the antenna D2 is orientated in such a manner as to radiate strong carrier waves along the streets S. Due to this feature of the invention, a radio receiver carried in a vehicle moving along the avenues A and streets S of the urban area UA will always receive carrier waves of high intensity even when it is moving through shadowed areas created by a multiplicity of tall buildings located in the urban area UA.

Each of the radio transmitters T1 and T2 is designed to generate ultra high frequency carrier waves having the same mean frequency F and substantially the same intensity. During operation of the system, both of the transmitters T1 and T2 are energized at the same time by any suitable means known to those skilled in the art with the result that their carrier waves are radiated simultaneously from the antennas D1 and D2. In addition, as is indicated in the drawing, the radio transmitters T1 and T2 are equipped with conventional modulators M1 and M2, respectively, for modulating the frequency of their carrier waves with signaling energy in a manner well known to those skilled in the art.

Duplicate signal currents are supplied simultaneously to each of the modulators M1 and M2 over respectively associated wire transmission lines W1 and W2 extending from a signal originating station or central office CO. For purposes of simplicity, the wire transmission lines W1 and W2 have been shown in the drawing as single lines, but it is to be understood that they actually may be conventional two-wire or four-wire lines. At the central office CO, the wire lines W1 and W2 are connected to one side of a conventional bridge circuit BC having its other side coupled to a signal source SS of any suitable type, such as a telephone switchboard. Thus, intelligence signals from the source SS at the signal originating station CO are applied to the bridge circuit BC which transmits them in duplicate over each of the wire lines W1 and W2 simultaneously to the base stations B1 and B2 where the modulators M1 and M2 simultaneously impress the duplicate signals upon the carrier waves generated by the radio transmitters T1 and T2. The resulting duplicate signal-modulated carrier waves are then radiated simultaneously by the horizontally directive antennas D1 and D2 along the avenues A and streets S of the urban area UA.

Signals sent in this manner by the base stations B1 and B2 are received in the urban area UA by radio receivers carried in vehicles moving along the avenues A and streets S. Although there may be a considerable number of such mobile stations in the urban area UA, only one has been shown in the drawing for purposes of simplicity. This mobile station MS is represented as including a directional antenna array D3 mounted on a vehicle V, such as an automobile, and coupled to a conventional frequency modulation radio receiver R carried in the vehicle V. The radio receiver R is equipped with a conventional limiter circuit L. As is well known, when two different currents are applied simultaneously to the limiter L, it discriminates in favor of the current of higher level, with the weaker current producing only a slight frequency modulation of the stronger current. Thus, the limiter L acts, in effect, as a selector of the wave of greater amplitude, with the weaker wave being substantially excluded.

In order to minimize the occurrence of intermodulation products that might be produced by the presence of both carriers simultaneously in the first stages of the radio receiver R, the vehicular antenna D3 is designed to have a figure eight directivity pattern in the horizontal plane with its nulls appearing at the sides of the vehicle V and its main axis parallel with the longitudinal axis of the vehicle V for favoring reception of carrier waves sent along the path of travel of the vehicle V. This directivity pattern is obtained by mounting two quarter-wave whip antennas fore and aft on top of the vehicle V at a spacing of half a wavelength, and by separately connecting these whip antennas to the radio receiver R through individual transmission lines with one line having 180 degrees more phase change than that of the other. This type of two-element antenna array is well known to those skilled in the art and has been described in various publications, such as F. E. Terman's "Radio Engineers' Handbook," first edition, pages 803 and 804.

The use of such an antenna array provides approximately a three decibel gain with respect to a single element antenna in the case of carrier waves sent along the path of travel of the vehicle V and about a twenty decibel loss in the case of carrier waves sent in a direction transversely to the sides of the vehicle V. Since the directivity pattern of the vehicular antenna D3 thus provides gain for one of the carriers while imposing loss upon the other carrier, the currents resulting from these two carriers will, when applied to the limiter L, always have sufficiently different levels to insure that the limiter L will always be able to perform the function of substantially eliminating the current of lower level. Due to this selective process, the radio receiver R will be captured by carrier energy from only one of the base station transmitters T1 or T2 at any one time and will encounter substantially no heterodyne interference even when the vehicle V is at intersections of the avenues A and streets S.

Thus, as the mobile station MS moves through the urban area UA, its radio receiver R will be captured by carrier waves sent from one or the other of the base transmitters T1 and T2 depending on whether the vehicle V is traveling along an avenue A or a street S. Specifically, if the vehicle V is proceeding along one of the avenues A, it will be captured by carrier sent from the base station B1, whereas, if it is traveling along one of the streets S, it will be captured by carrier from the base station B2. It can therefore be understood that this ultra high frequency radio telephone system provides substantially uniform service coverage throughout the urban area UA even when a mobile station, such as the station MS, is moving through shadowed areas created by a multiplicity of tall buildings.

The transmission of signals from the mobile station MS to the central office CO is accomplished by operating a conventional radio telephone transmitter T3 carried in the vehicle V. This causes signal-modulated carrier waves to be radiated from the vehicular directional antenna D3 along either an avenue A or a street S depending on the direction in which the vehicle V is traveling. These carrier waves will be received with satisfactory intensity by one or the other of conventional radio receivers R1 and R2 associated with the base stations B1 and B2, respectively. Signals thus received by the radio receivers R1 and R2 are demodulated and the resulting audio frequency signals are sent over conventional wire lines W3 and W4 to a conventional control terminal CT at the central office CO.

What is claimed is:

1. An ultra high frequency radio signaling system for an urban area having parallel avenues extending in a first direction and parallel streets extending in a second direction, said first and second directions being at substantially right angles to each other, said urban area having a multiplicity of tall buildings creating shadowed areas along said avenues and streets, said radio system having means for improving the transmission and reception of signals within said shadowed areas, said means comprising in combination a first radio transmitting station located outside said urban area in said first direction and having a horizontally directive antenna orientated for radiating carrier waves along said avenues, a second radio transmitting station located outside said urban area in said second direction and having a horizontally directive antenna orientated for radiating carrier waves along said streets, the carrier energy sent from said first transmitting station being of the same frequency and substantially the same intensity as the carrier energy sent from said second transmitting station, a signal originating station for producing intelligence signals, a plurality of wire transmission lines connecting said signal originating station to said first and second transmitting stations for carrying said intelligence signals thereto, modulating means at said first and second transmitting stations for simultaneously modulating the carrier waves produced at said first and second transmitting stations with duplicate intelligence signals carried over said wire lines from said signal originating station, a radio receiver carried in a vehicle moving along said avenues and streets in said urban area, a directive antenna coupled to said radio receiver and mounted on said vehicle for receiving the duplicate signal-modulated carrier waves transmitted from said first and second transmitting stations, said vehicular antenna having the main axis of its directivity pattern parallel with the longitudinal axis of the vehicle for favoring reception of carrier waves sent along the path of travel of said vehicle.

2. A radio signaling system for an urban area having parallel avenues extending in a first direction and parallel streets extending in a second direction, said first and second directions being at substantially right angles to each other, said urban area having a multiplicity of tall buildings creating shadowed areas along said avenues and streets, said radio system having means for improving the transmission and reception of signals within said shadowed areas, said means comprising in combination a first radio transmitting station located outside said urban area in said first direction, said first station having a first radio transmitter generating first carrier waves and a first horizontally directive antenna coupled to said transmitter and orientated to radiate said first carrier waves along said avenues, a second radio transmitting station located outside said urban area in said second direction, said second station having a second radio transmitter generating second carrier waves and a second horizontally directive antenna coupled to said second transmitter and orientated to radiate said second carrier waves along said streets, said first carrier waves being of the same frequency and substantially the same intensity as said second carrier waves, a signal originating station producing electrical signals, a plurality of wire lines connecting said signal originating station to said first and second radio transmitters for sending said signals thereto, modulating means in said first and second transmitters for simultaneously and identically modulating said first and second carriers with signals sent over said wire lines from said signal originating station, a directive antenna mounted on a vehicle moving along said avenues and streets for receiving said identically modulated first and second carriers, and a radio receiver carried in said vehicle and coupled to said vehicular directive antenna, said vehicular directive antenna having a figure eight directivity pattern with its main axis parallel to the longitudinal axis of the vehicle for applying gain to that one of said first and second carriers which is being sent along the path of travel of the vehicle and with its nulls appearing at the sides of the vehicle for imposing loss upon the other of said carriers.

References Cited in the file of this patent

UNITED STATES PATENTS

| | | |
|---|---|---|
| 2,033,271 | Aiken | Mar. 10, 1936 |
| 2,094,113 | Affel | Sept. 28, 1937 |
| 2,407,417 | Halstead | Sept. 10, 1946 |
| 2,497,958 | Peterson et al. | Feb. 21, 1950 |
| 2,610,292 | Bond et al. | Sept. 9, 1952 |
| 2,685,642 | Vallarino et al. | Aug. 3, 1954 |

FOREIGN PATENTS

| | | |
|---|---|---|
| 138,218 | Australia | Aug. 7, 1950 |
| 495,196 | Canada | Aug. 11, 1953 |

OTHER REFERENCES

FM-TV, November 1951, "450 Mc. Mobile Radio Service," pp. 22–25.